United States Patent [19]

Hazra et al.

[11] 4,411,565

[45] * Oct. 25, 1983

[54] FINISHING INSERT WITH IMPROVED CHIP CONTROL

[75] Inventors: Jayanta Hazra; Sazzadul Haque, both of Troy, Mich.

[73] Assignee: General Electric Company, Detroit, Mich.

[*] Notice: The portion of the term of this patent subsequent to Nov. 16, 1999, has been disclaimed.

[21] Appl. No.: 261,694

[22] Filed: May 8, 1981

[51] Int. Cl.³ .............................................. B26D 1/00
[52] U.S. Cl. .................................................... 407/114
[58] Field of Search ............................... 407/114, 115

[56] References Cited

U.S. PATENT DOCUMENTS

| | | | |
|---|---|---|---|
| 3,395,434 | 8/1968 | Wirfelt | 407/114 |
| 3,407,467 | 10/1968 | Wirfelt | 407/114 |
| 3,885,281 | 6/1974 | Stambler | 407/114 |
| 3,968,550 | 7/1976 | Gehri | 407/114 |
| 4,056,872 | 11/1977 | Seidel | 407/114 |
| 4,059,363 | 11/1977 | Romagnolo | 407/114 |
| 4,189,265 | 2/1980 | Arnold et al. | 407/114 |
| 4,288,179 | 9/1981 | Kruger et al. | 407/114 |
| 4,318,644 | 3/1982 | Seidel | 407/114 |
| 4,334,808 | 6/1982 | Seidel | 407/114 |
| 4,359,300 | 11/1982 | Hazra et al. | 407/114 |

FOREIGN PATENT DOCUMENTS 2231631 2/1973 Fed. Rep. of Germany ...... 407/114

Primary Examiner—Robert E. Garrett
Assistant Examiner—Jerry Kearns
Attorney, Agent, or Firm—Hedman, Casella, Gibson, Costigan & Hoare

[57] ABSTRACT

A finishing insert for use with an indexable cutting tool is formed from a flat wafer of cutting material which is generally polygonal in plan form and includes a pair of opposed faces and a plurality of upstanding side walls extending therebetween. The juncture of the side walls with each face defines the cutting edges of the insert. The polygonal insert includes a plurality of radiused corner portions and is provided with at least one nonplanar insert face wherein the corner portions thereof slope inwardly towards the opposed face of the insert. Each corner portion further includes a pair of generally triangular chip grooves separated by a planar central triangular land area. Each chip groove is spaced from the peripheral cutting edge of the insert to define a side land area which increases in width from the corner portion to its opposed end. In addition each chip groove increases in both width and depth from the corner portion to its opposed end. Each peripheral edge of the insert is generally trough-shaped in configuration and includes a central planar undercut area. Each peripheral edge further includes a V-shaped land area with the apex thereof being disposed closest to but spaced from the undercut area. The unique configuration of the chip grooves and the peripheral edges of the insert function to reduce the forces imposed on the insert and enables the insert to be utilized over a wide range of feed rates and at various cutting depths corresponding to finishing operations, while simultaneously increasing the life of the insert.

6 Claims, 5 Drawing Figures

FINISHING INSERT WITH IMPROVED CHIP CONTROL

BACKGROUND OF THE INVENTION

The subject invention relates to finishing inserts which are used in conjunction with indexable cutting tools. The subject inserts are intended to be used for finishing operations wherein small amounts of material are removed when smoothing machined parts. The finishing insert as disclosed herein represents a modification of the unique cutting insert disclosed in prior copending U.S. application Ser. No. 221,006 filed Dec. 29, 1980, now U.S. Pat. No. 4,359,300 the subject matter of which is incorporated herein by reference.

Indexable cutting tools which are finding wide acceptance in the industry are used in conjunction with replaceable cutting inserts, the latter being formed from a block of abrasion resistant material having a plurality of cutting edges. When a single cutting edge is worn, the insert is rotated to expose a fresh cutting edge such that machining may continue. In a typical machining operation, a workpiece is rotated relative to a cutting tool such that continuous strand portions of the metal workpiece, commonly referred to as chips, are removed in order to form the desired configuration on the workpiece. In finishing operations, relatively thin strands are removed in an effort to produce a smooth surface.

Finishing operations, which are carried out at relatively high speed, light chip load, light feeds, and light depth of cut, produce long chip strands which interfere with the machining of workpiece. More specifically, long chip strands tend to snake out around or over the workpiece thereby abrading the finish which has been carefully smoothed during the earlier phases of the cutting operation. In addition, long strands of metal removed during the operation often pose a safety hazard to the tool operator.

Accordingly, many prior art inserts have been developed which include a configuration which is capable of breaking the chip strands into small pieces thereby obviating the above described problems. More particularly, the inserts include built in chip control grooves which deflect the chips and break them in small pieces. Unfortunately, the configuration of the chip control grooves of the prior art were limited in their application to specific feed rates and depth of cuts. Stated differently, the chip grooves and outer land areas provided on the prior art inserts were only effective when machining at specific depths and feed rates. In the above mentioned copending application, there is disclosed a new and improved insert having chip controlling configuration which may be effectively used in a broad range of cutting depths and feed rates. The insert configurations disclosed in the prior application may be used in conjunction with a variety of standard cutting operations. However, it would be desirable to provide a modified insert configuration which may be used in highly specialized finishing operations wherein lower feed rates and shallower cutting depths are encountered.

Therefore, it is an object of the subject invention to provide a new and improved finishing insert which includes a unique chip groove and central land area configuration which may be utilized to machine finishing cuts throughout a broad range of feed rates and depths.

It is a further object of the subject invention to provide a new and improved cutting insert including a unique chip groove configuration which provides greater chip control at lower feeds, and reduces force and power requirement for a finishing operation thereby increasing metal removal rates per unit of power and reducing temperatures so as to minimize thermal wear and other heat associated problems. Accordingly, longer tool life is achieved.

It is another object of the subject invention to provide a new and improved finishing insert which includes a unique peripheral edge configuration including a V-backed undercut area which is particularly adapted for finishing operations. Furthermore, the unique peripheral edge of the insert of the subject invention employs the benefits of a positive back and side rake angle to further reduce forces, and hence power requirements. Hence, chatter and vibration are effectively reduced or eliminated during a high speed finishing operation.

SUMMARY OF THE INVENTION

The finishing insert of the subject invention is formed from a wafer of cutting material, preferably cemented carbide which is a hard, abrasion resistant metal. The finishing insert is polygonal in plan and includes a pair of opposed faces and a plurality of upstanding side walls extending therebetween, with the juncture between the side walls and the opposed faces defining the peripheral cutting edges of the insert. The insert is provided with a plurality of radiused corner portions, the number of which being dependent upon the particular configuration of the polygonal insert. At least one insert face is nonplanar and includes a configuration which aids in chip control. More specifically, each corner portion of the insert slopes inwardly towards the opposed face of the insert. Further, each corner portion includes a pair of abutting, generally triangular chip grooves separated by a planar central triangular land area. The pair of chip grooves are disposed in mirror image relationship and are spaced from the respective adjacent cutting edge, to define side land areas.

The central triangular land area includes a pair of side edges and a vertex and is located such that an imaginary line bisecting the vertex is disposed substantially normal to the radiused corner portion associated therewith. The upper planar surface of the central land area is disposed parallel to the opposed insert face. The width of both the chip grooves and the side land areas increase outwardly from the associated corner portion. The depth of each chip groove portion also increases outwardly from the associated corner portion. In accordance with the subject invention, each peripheral cutting edge of the insert is generally trough shaped in configuration, with the distal ends being defined by the sloping corner portions, while the central portion of the trough configuration is defined by a generally planar undercut area. Preferably, the undercut area is disposed substantially parallel to the opposed insert face. The peripheral cutting edge further includes a V-shaped land area with the apex thereof being disposed closest to and spaced from the associated cutting edge. The configuration of the subject insert may be utilized to machine finishing cuts through a wide range of feed rates while simultaneously reducing cutting forces and temperatures thereby lengthening the insert's life.

Further objects and advantages of the subject invention will become apparent with reference to the following detailed description in conjunction with the drawings in which:

DETAILED DESCRIPTION OF THE PREFERRED EMBODIMENT

Figure 1:
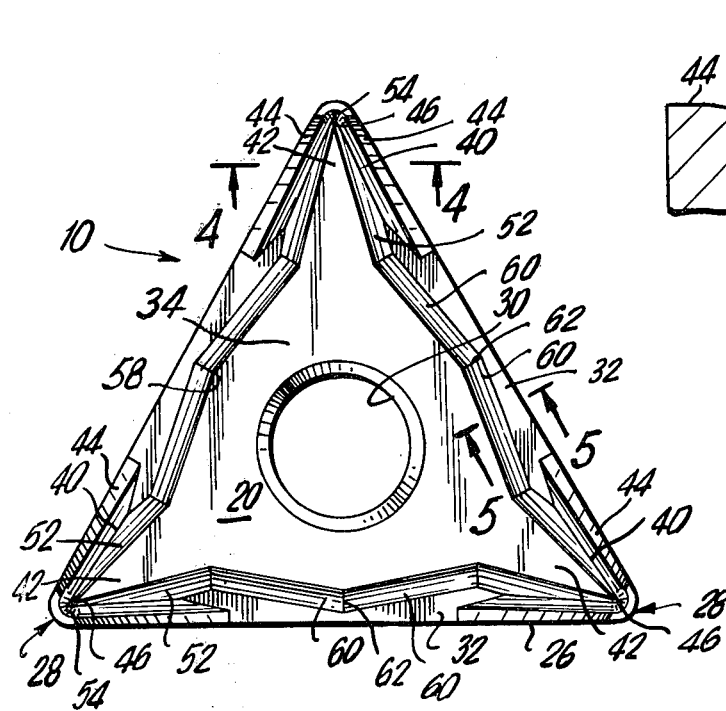
FIG. 1 is a perspective view of the new and improved finishing insert of the subject invention.
Figure 4:
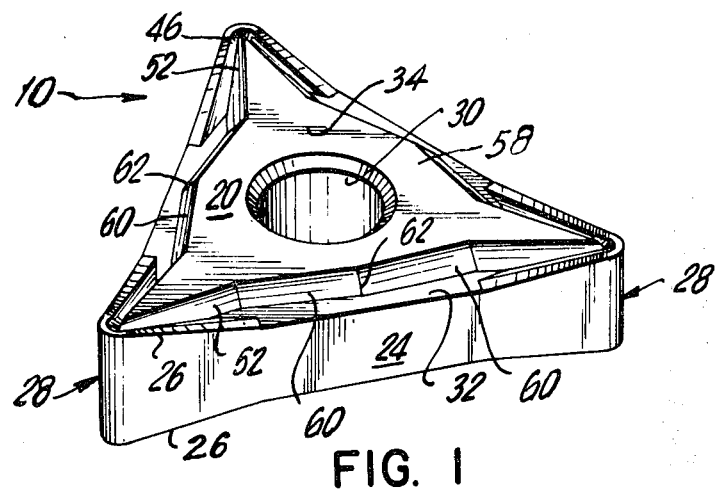
FIG. 4 is a partial cross sectional view of the finishing insert of the subject invention, taken along line 4—4 of FIG. 2.

Referring to FIGS. 1-5, the cutting insert 10 of the subject invention is illustrated and is intended for use in a broad range of relatively light chip load applications. More specifically, the subject finishing insert is intended to be used where feed rates are between 0.003 and 0.022 inches per revolution and cutting depths of between 0.020 and 0.250 inches. The cutting insert 10 is typically formed from a wafer of hard, abrasion resistant metal such as cemented carbide, and is generally polygonal in plan form. The insert 10 is provided with a pair of opposed insert faces 20 and 22 and a plurality of upstanding side walls 24 extending essentially perpendicularly therebetween. The juncture between each side wall 24 and the insert faces defines the peripheral cutting edges 26 of the insert.

The illustrated insert 10 is shown to be triangular in configuration, having three corner portions 28 which are rounded or radiused. In a one-half inch inscribed circle triangular insert, having a thickness of approximately 0.375 inches, the corner portions 28 are provided with a radius of 1/32nd of an inch. It will be understood that while the insert 10 depicted in the figures is generally triangular in plan, the scope of the subject invention is intended to include inserts of any polygonal configuration such as square, diamond, etc. The insert 10 may be provided with a central aperture 30 for mounting the insert on a tool holder.

In accordance with the subject invention, at least one of the insert faces is nonplanar and is provided with a configuration adapted to control chips through a wide range of feed rates and cutting depths. In the illustrated embodiment, both the upper and lower planar surfaces 20 and 22 are provided with an identical configuration such that each surface has a total of six peripheral cutting edges 26. The specific configuration of the underside 22 of the insert is identical to the configuration of the upper face 20, the latter being shown in detail in the figures. Cutting edges 26 extend at an angle between 3° and 15° relative to the planar surfaces 20, 22.

The upper planar face 20 of the insert is provided with corner portions 28 which slope inwardly towards the opposed rake face 22. Each of the corner portions slopes downwardly to undercut area 32 such that when viewed from the side as in FIG. 3, each peripheral cutting edge is generally trough-shaped in configuration. The central area 32 is generally planar in configuration and is disposed parallel to the opposed insert face 22.

In accordance with the subject invention, each corner portion further includes a pair of abutting, generally triangular chip grooves 40 which are separated by central triangular planar land area 42. Preferably, central triangular planar land area 42 is formed integrally with central planar surface 34, and therefore is disposed in parallel relationship to the opposed insert face 22. Chip grooves 40 are disposed in mirror image relationship about central land area 42 and are spaced from the adjacent cutting edges 26 thereby defining a pair of side land areas 44. Preferably, the width of each side land area 44 increases outwardly from the tip of the corner portion 28 to its opposed end.

Central land area 42 includes a vertex 46 and a pair of sides 52, and is located such that an imaginary line bisecting the vertex 46 is disposed normal to the associated radiused corner portions. The side edges 52 of land area 42 are disposed at an angle, preferably on the order of 30°-50°, relative to the planar undercut area 32 such that the width and depth of the chip grooves 40 increase outwardly from the corner portion 28. As discussed more fully hereinbelow, the varying width of the side land areas 44 and the chip grooves 40 enables the insert to handle a broad range of finishing feed rates and reduces the cutting forces on the workpiece and the insert.

The vertex 46 of the central land area is spaced from the tip of the corner portion 28 such that a common chip groove area 54 is defined joining the opposed chip grooves 40. The common area 54 slopes inwardly preferably at an angle between 10°-30° towards the opposed insert face 22 from the corner portion 28 to its opposed end. Common area 54 is provided to enable chips to flow more readily into the chip grooves 40.

Figure 5:
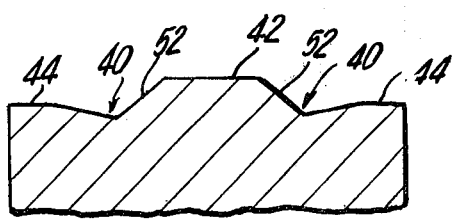
FIG. 5 is a partial cross sectional view of the finishing insert of the subject invention taken along the line 5—5 of FIG. 2.
Figure 2:
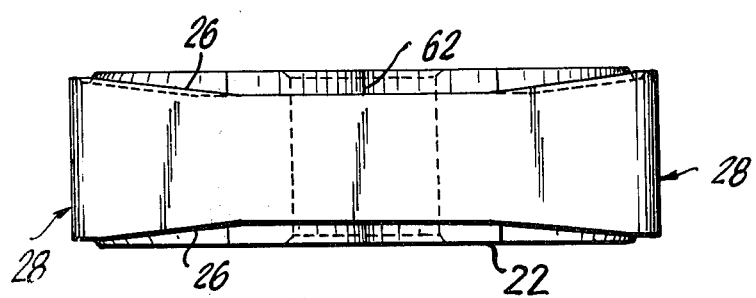
FIG. 2 is a top plan view of the finishing insert of the subject invention.
Figure 3:
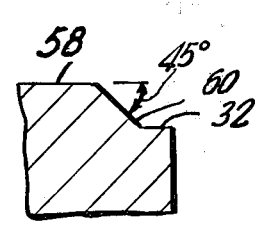
FIG. 3 is a side elevational view of the finishing insert of the subject invention.

In the preferred embodiment of the subject invention, each peripheral edge further includes a V-shaped land area 58 having an apex 62 and a pair of side walls 60. As illustrated in FIG. 2, preferably, V-shaped land area 58 is formed integrally with the planar central surface 34 of the insert face. In accordance with the subject invention, the apex of the V is disposed at a mid-point between the opposed ends of the peripheral cutting edge 26. Further, the apex 62 of the V-shaped land 58 is disposed closest to but spaced from the peripheral cutting edge 26 whereby a continuous channel is defined along the undercut area 32 between the associated chip controlling grooves 40. Preferably, and as illustrated in FIG. 5, side walls 60 of V-shaped land area 58 are disposed at an angle between 30° and 50°, such as at a 45° angle relative to planar undercut area 32.

The configuration of the subject insert enables it to be used throughout a range of feed rates and cutting depths associated with finishing operations. More specifically, as the workpiece feed rate is increased for a given chip groove width, so does the tightness of the curl of the chip being removed from the workpiece. In practice it has been found that as the tightness of the chip curl increases, so does the force exerted on the insert, thus resulting in greater wear thereby shortening the life of the insert. By providing a chip groove of varying width and depth, a desired increase in feed rate can be readily accommodated by using a portion of the cutting edge 26 that is aligned with a wider and deeper portion of the chip groove 40. By this arrangement, the tightness of the chip curl can be regulated such that less force will be exerted on the insert and the workpiece, which reduces temperatures as well as lengthening the life of the insert.

The finishing insert of the subject invention can be used to machine cuts varying in depth from 0.020 to 0.250 inches. As the desired depth of the cut to be effected is increased, the support for the cutting edge 26 of the insert must be increased. The support for the cutting edge is provided by the side land areas 44. Since the width of each side land area 44 increases, by selectively placing the workpiece against that portion of the side land area having the desired width, sufficient support for the cutting edge can be provided for a particular machining situation. Thus, where a relatively shallow depth of cut is desired, the portion of the cutting edge 26 adjacent the corner portion 28, where the side land area 44 is narrowest can be utilized. In the alternative, where a greater depth of cut is desired, a portion of the cutting edge 26 farther from the corner portion 28, where the side land area 44 is wider can be utilized to provide increased support.

As noted above, each chip groove 40 increases in depth from the radiused corner portion to its opposed end. This arrangement also functions to reduce forces exerted by the chips on the insert and the workpiece. Preferably, insert 10 is provided with positive back and side rake angles which reduce deflection as well as unwanted chatter and vibration.

In summary, the subject invention provides for a new and improved finishing insert having a unique configuration for controlling chips. More specifically, a generally polygonal insert is provided having corner portions which slope inwardly towards the opposed insert face. Each corner portion includes a pair of generally triangular chip grooves separated by a central planar triangular land area. Each of the chip grooves is spaced from the associated cutting edge to define a pair of side land areas. Preferably, the width and depth of the chip grooves as well as the side land areas increase from the corner portion outwardly. In accordance with the subject invention, each peripheral cutting edge of the insert is generally trough-shaped in configuration with its central portion being defined by a generally planar undercut area which is parallel to the opposed insert face. A central V-shaped land area is provided adjacent the undercut area, with the apex thereof being disposed closest to but spaced from the peripheral cutting edge. The unique chip groove configuration results in a significant reduction in the force to which the insert is subjected during a given application. This reduction of force also effects a reduction in operating temperature, with that reduction resulting in the lengthening of the insert life.

While the subject invention has been described in connection with a preferred embodiment, it is apparent that other alternatives and modifications may be included within the spirit and scope of the subject invention as defined by the appended claims.

We claim:

1. A finishing insert for use with an indexable cutting tool comprising:

a flat wafer of cutting material of generally polygonal plan form, having a pair of opposed faces and a plurality of upstanding side walls extending therebetween with the juncture between each said side wall and a face defining a peripheral cutting edge, wherein each peripheral cutting edge adjacent said one face is generally trough-shaped in configuration, with the distal ends of said trough configuration being defined by said sloping corner portions and with the central portion of said trough configuration being defined by a generally planar undercut area, said planar undercut area being disposed substantially parallel to said opposed insert face, said polygonal wafer further including a plurality of radiused corner portions with at least one of said insert faces being non-planar with the corner portions thereof sloping inwardly towards the opposed insert face, each of said corner portions of said nonplanar face including a pair of abutting, generally triangular chip groove portions and a central triangular land area disposed between each pair of abutting chip groove portions, each chip groove portion being spaced from the adjacent cutting edge of the insert so as to define a side land area, said central triangular land area being generally planar and disposed parallel to said opposed insert face, each said central triangular land area including a pair of side edges and a vertex, with an imaginary line bisecting said vertex being disposed substantially normal to the radiused corner portion associated therewith, and with said side edges of each said triangular land area being disposed at an angle relative to the adjacent cutting edges of the insert such that the width of each said chip groove portion increases from its end adjacent its respective corner portion to its opposed end, and with the depth of each chip groove portion increasing from its end adjacent its respective corner portion to its opposed end whereby said insert may be utilized to machine finishing cuts through a range of feed rates while simultaneously reducing cutting forces.

2. A finishing insert as recited in claim 1 wherein each said peripheral cutting edge further includes a V-shaped land area disposed adjacent to said undercut area, with the apex of said V-shaped land area being disposed closest to and spaced from the associated cutting edge.

3. A finishing insert as recited in claim 2 wherein the sides of said V-shaped land area are disposed at an angle between 30° and 50° relative to said planar undercut area.

4. A finishing insert as recited in claim 3 wherein said angle is 45°.

5. A finishing insert as recited in claim 1 wherein each cutting edge is disposed at an angle between 3° and 15° relative to the associated planar undercut area.

6. A finishing insert for use with an indexable cutting tool comprising:

a flat wafer of cutting material of generally polygonal plan form, having a pair of opposed faces and a plurality of upstanding side walls extending therebetween with the juncture between each said side wall and a face defining a peripheral cutting edge, said polygonal wafer further including a plurality of radiused corner portions with at least one of said insert faces being nonplanar with the corner portions thereof sloping inwardly towards the opposed insert face, each of said corner portions of said nonplanar face including a pair of abutting, generally triangular chip groove portions and a central triangular land area disposed between each pair of abutting chip groove portions, each chip groove portion being spaced from the adjacent cutting edge of the insert so as to define a side land area, said central triangular land area being generally planar and disposed parallel to said opposed insert face, each said central triangular land area including a pair of side edges and a vertex, with an imaginary line bisecting said vertex being disposed substantially normal to the radiused corner portion associated therewith, and with said side edges of each said triangular land area being disposed at an angle relative to the adjacent cutting edges of the insert such that the width of each said chip groove portion increases from its end adjacent its respective corner portion to its opposed end, and with the depth of each chip groove portion increasing from its end adjacent its respective corner portion to its opposed end, and with each said side land area increasing in width from its end adjacent the associated corner portion to its opposed end, and with each peripheral cutting edge adjacent said one face being generally trough-shaped in configuration, with the distal ends of said trough configuration being defined by said sloping corner portions and with the central portion of said trough configuration being defined by a generally planar undercut area, said planar undercut area being disposed substantially parallel to said opposed insert face, and with each said peripheral cutting edge further including a V-shaped land area with the apex of said V-shaped area being disposed closest to and spaced from the associated cutting edge.

* * * * *